US012611351B2

(12) United States Patent
Seltzer et al.

(10) Patent No.: US 12,611,351 B2
(45) Date of Patent: Apr. 28, 2026

(54) MEDICAL PROCEDURE FACILITATION SYSTEM

(71) Applicants: William Beaumont Hospital, Royal Oak, MI (US); GRAND VALLEY STATE UNIVERSITY, Allendale, MI (US)

(72) Inventors: Marlene Seltzer, Royal Oak, MI (US); Robert A. Long, Lansing, MI (US); John Farris, Grand Rapids, MI (US); Taylor Rieckhoff, Elgin, IL (US); Jack Mackillop, Grand Rapids, MI (US); Peter Weyers, Grand Rapids, MI (US); Hannah Klein, Chesterfield Township, MI (US); Austin Bessinger, West Olive, MI (US); Morgan Benjamin, Plymouth, MI (US); Jacob D. Stephens, Lowell, MI (US); Jordan Vanderham, Holland, MI (US); Chris Pung, Portland, MI (US)

(73) Assignees: Grand Valley State University, Allendale, MI (US); William Beaumont Hospital, Royal Oak, MI (US)

( * ) Notice: Subject to any disclaimer, the term of this patent is extended or adjusted under 35 U.S.C. 154(b) by 973 days.

(21) Appl. No.: 17/575,426

(22) Filed: Jan. 13, 2022

(65) Prior Publication Data

US 2022/0233383 A1 Jul. 28, 2022

Related U.S. Application Data

(60) Provisional application No. 63/142,686, filed on Jan. 28, 2021.

(51) Int. Cl.
*A61G 13/00* (2006.01)
*A61G 13/12* (2006.01)

(52) U.S. Cl.
CPC ....... *A61G 13/0009* (2013.01); *A61G 13/123* (2013.01)

(58) Field of Classification Search
CPC .............. A61G 13/0009; A61G 13/123; A61G 2200/12; A61G 13/1245; A61G 2200/16; A61G 13/12; A61G 13/125; A61G 7/0755
(Continued)

(56) References Cited

U.S. PATENT DOCUMENTS

| | | | | |
|---|---|---|---|---|
| 3,318,596 A | | 5/1967 | Herzog | |
| 4,886,258 A | * | 12/1989 | Scott | A61G 13/12 5/624 |

(Continued)

FOREIGN PATENT DOCUMENTS

| | | |
|---|---|---|
| AT | 396327 B | 12/1992 |
| CA | 2107212 | 10/1992 |

(Continued)

*Primary Examiner* — Myles A Throop

(74) *Attorney, Agent, or Firm* — Honigman LLP; Douglas H. Siegel

(57) ABSTRACT

A medical procedure facilitation system for use with a bed. The system has a pair of assist arms secured to the bed that may rotate in relation to the bed along a path of rotation. A spring assembly is connected to the assist arms for helping raise a patient's legs. Supportive thigh pads associated with the assist arms give support under the knees and thighs and adjust their angle to accommodate the size and position of the patient. Hand grips are mounted on the support arms that allow the patient to contribute to lifting forces.

20 Claims, 7 Drawing Sheets

(58) Field of Classification Search
USPC .............................................................. 5/624
See application file for complete search history.

(56) References Cited

U.S. PATENT DOCUMENTS

| | | | | |
|---|---|---|---|---|
| 5,104,363 | A * | 4/1992 | Shi | A63B 22/0076 482/73 |
| 5,157,800 | A | 10/1992 | Borders | |
| 5,774,914 | A | 7/1998 | Johnson | |
| 5,961,085 | A | 10/1999 | Navarro | |
| 6,196,631 | B1 | 3/2001 | Larson | |
| 6,256,812 | B1 * | 7/2001 | Bartow | A61G 1/0268 5/81.1 R |
| 6,704,959 | B2 * | 3/2004 | Schuerch | A61G 13/12 5/624 |
| 6,725,479 | B1 * | 4/2004 | Stryker | A61G 7/0509 5/624 |
| 7,536,734 | B2 * | 5/2009 | Heimbrock | A61G 13/0009 5/624 |
| 7,657,953 | B2 * | 2/2010 | Reckelhoff | A61G 13/0009 5/624 |
| 7,951,097 | B2 | 5/2011 | Schaeffer | |
| 8,327,480 | B2 | 12/2012 | Ganance et al. | |
| 10,737,602 | B2 | 8/2020 | Weinberger | |
| 2002/0083527 | A1 | 7/2002 | Ruehl | |
| 2006/0225215 | A1 * | 10/2006 | Krecow | A61G 13/12 5/648 |
| 2009/0126104 | A1 | 5/2009 | Lukasiak | |
| 2010/0223727 | A1 | 9/2010 | Newkirk | |
| 2016/0120726 | A1 | 5/2016 | Moriaty | |
| 2020/0375832 | A1 * | 12/2020 | Wagner | A61G 13/1245 |

FOREIGN PATENT DOCUMENTS

| | | | |
|---|---|---|---|
| CN | 201612771 | U | 10/2010 |
| CN | 107951660 | B | 3/2020 |
| EP | 0539089 | | 4/1993 |
| WO | 1993/009750 | A | 5/1993 |

* cited by examiner

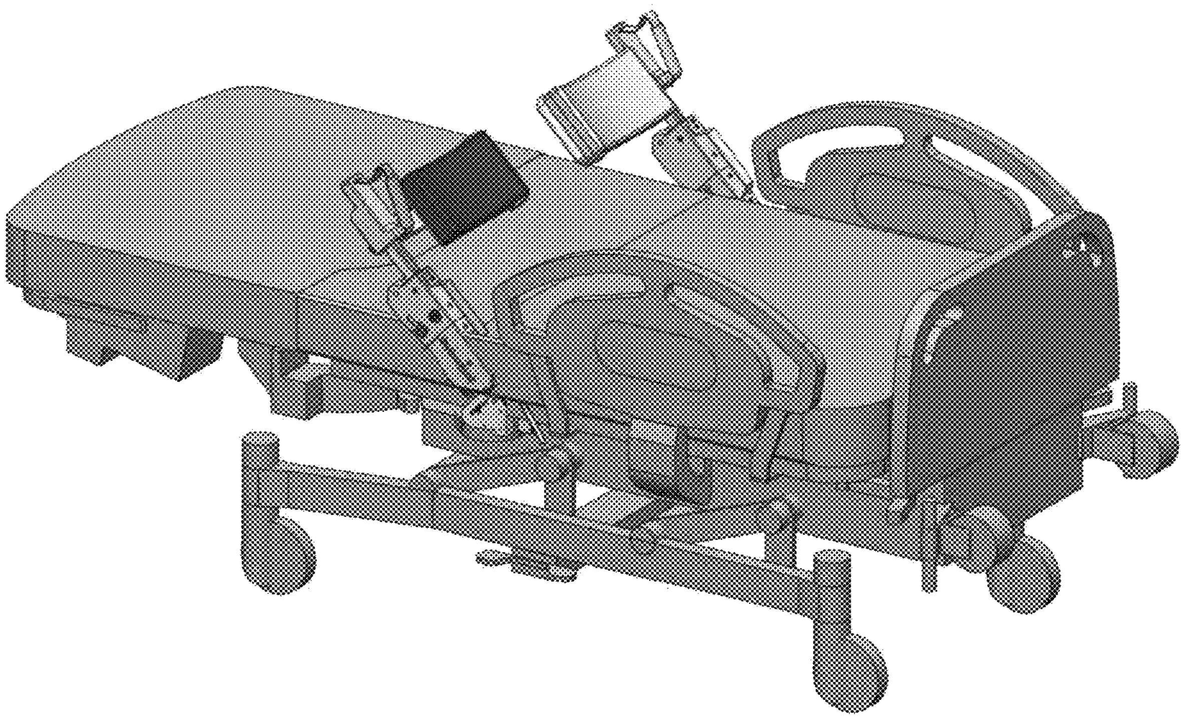
Figure 1: Two Assist Arms on Hospital Labor Bed

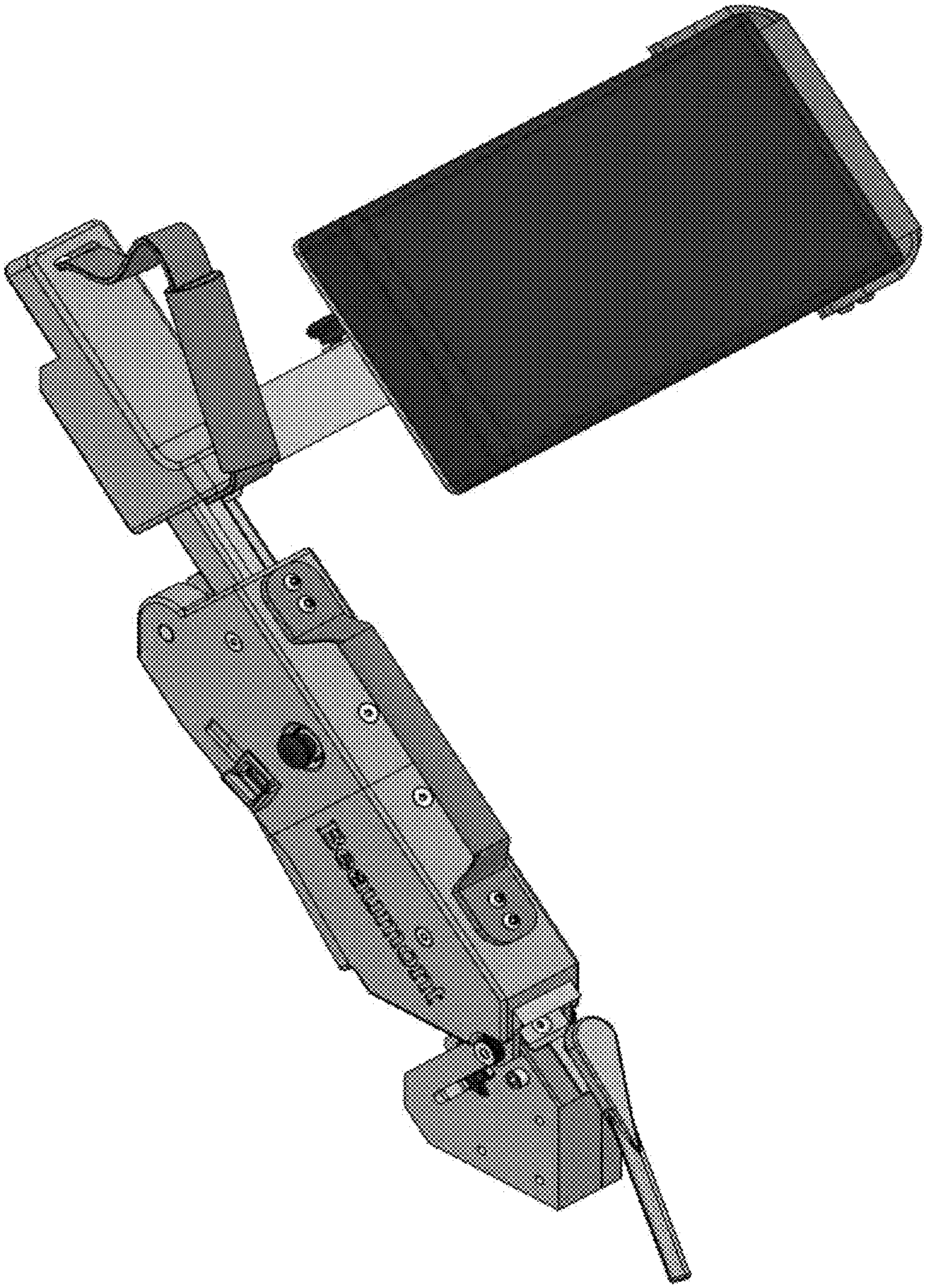
Figure 2: Isometric of Assist Arm

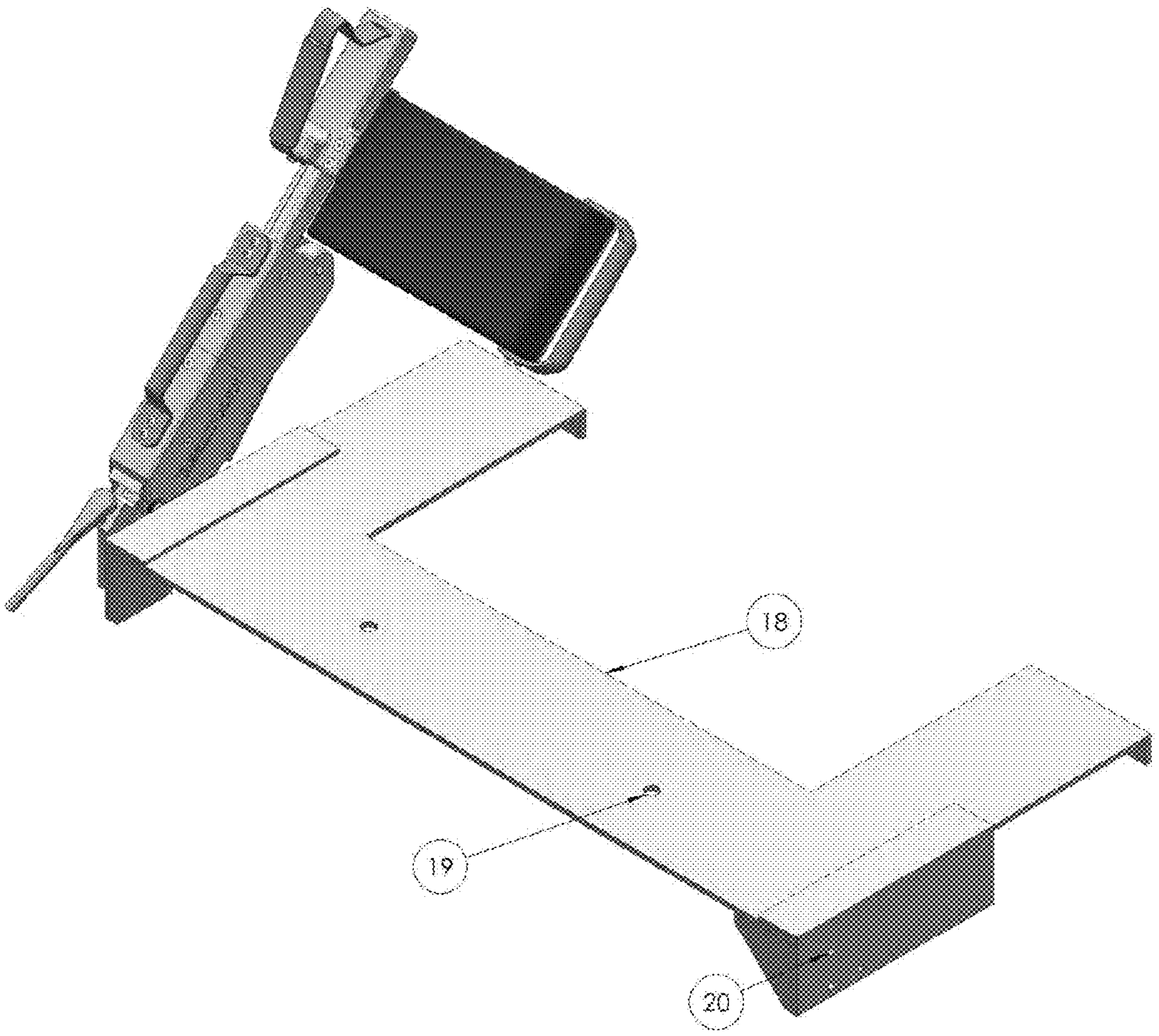
Figure 3: Isometric of Assembly and one Assist Arm

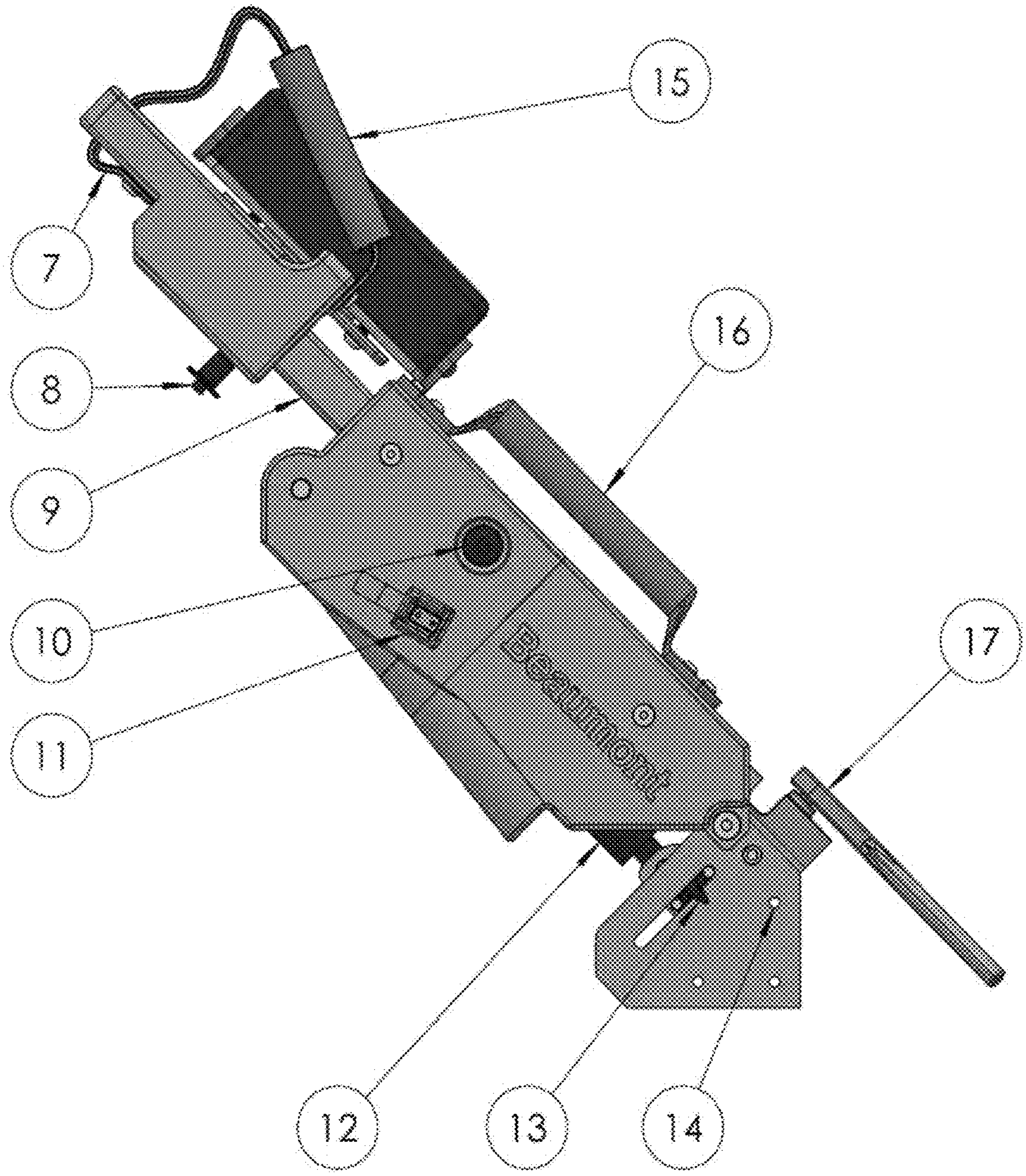
Figure 4: Side of Assist Arm

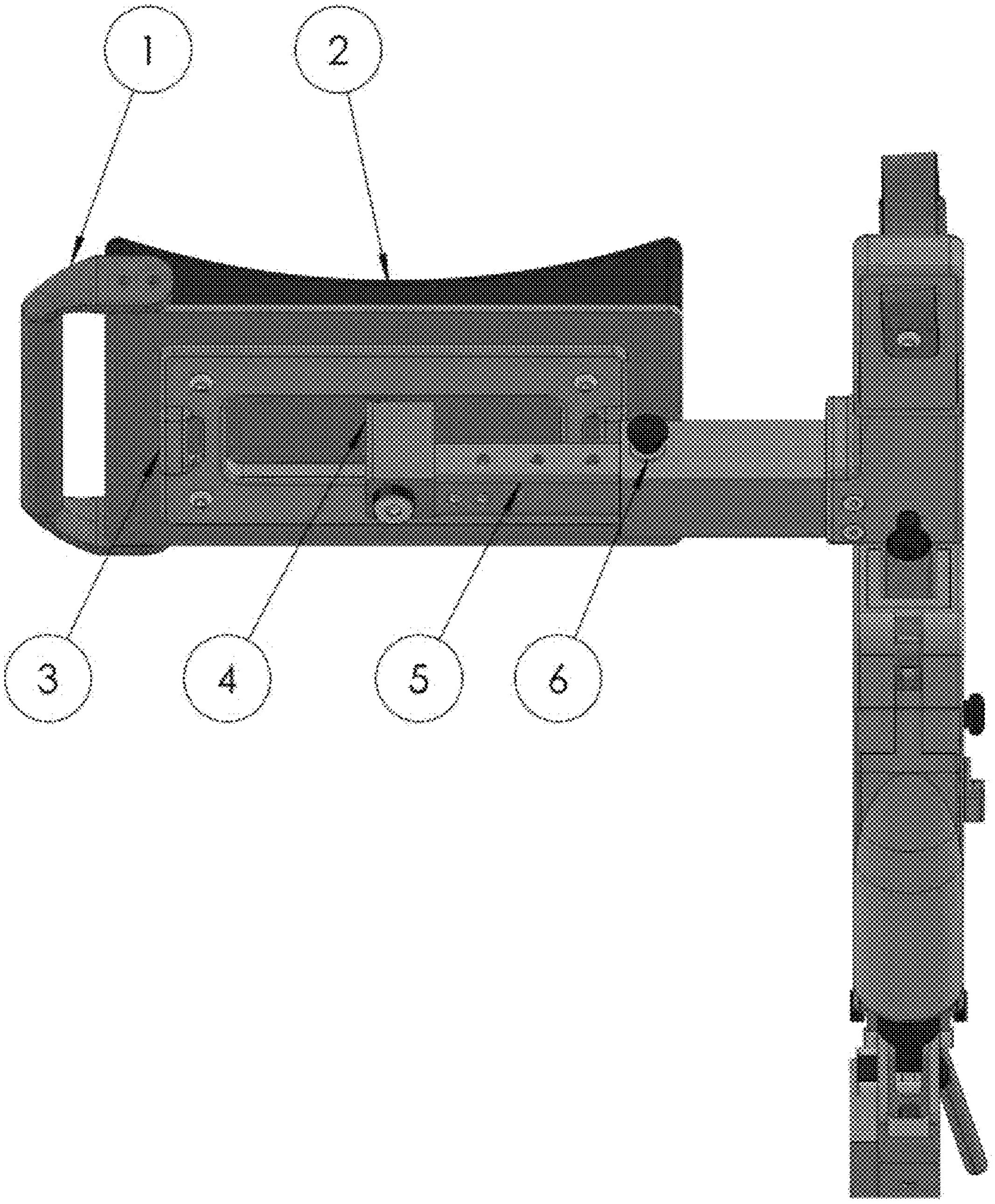
Figure 5: Back of Assist Arm

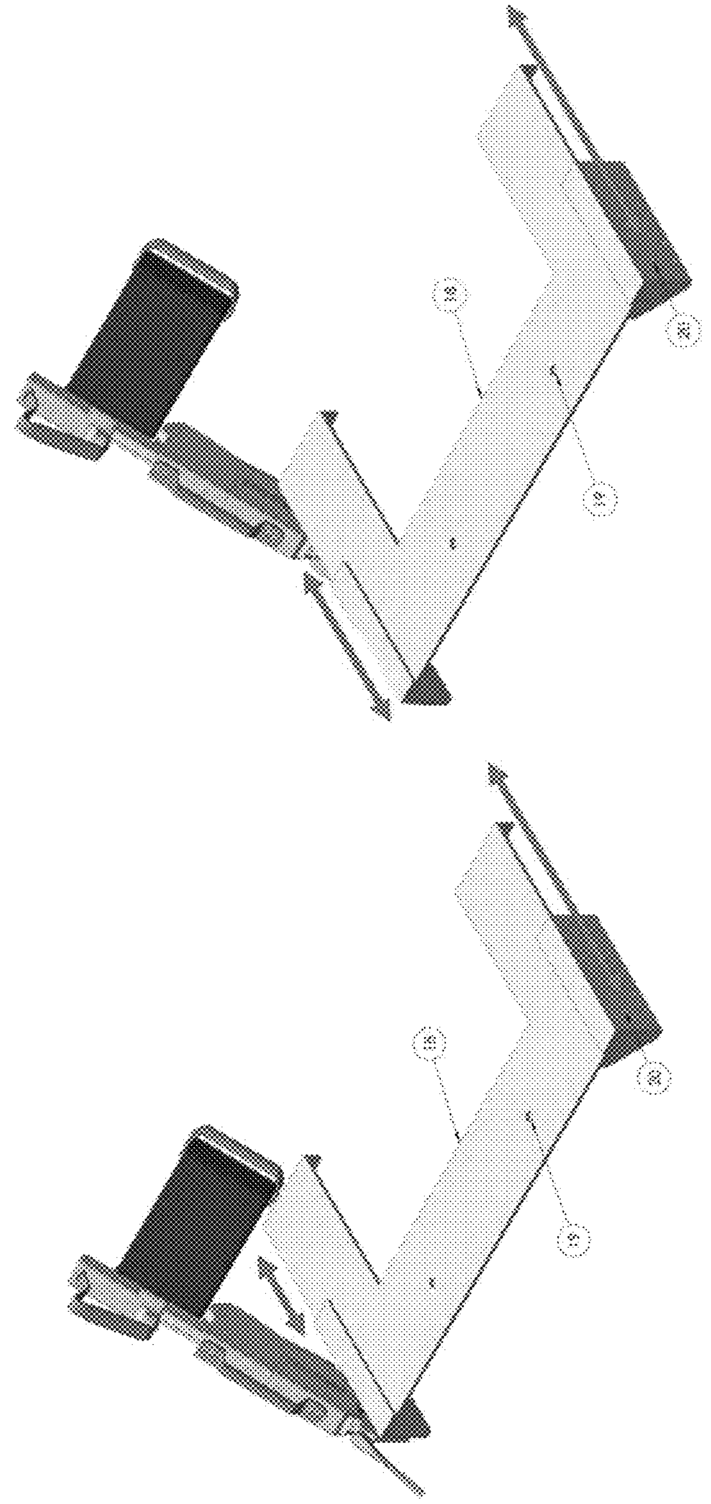
Figure 6: Example of side arms sliding on mounting plate

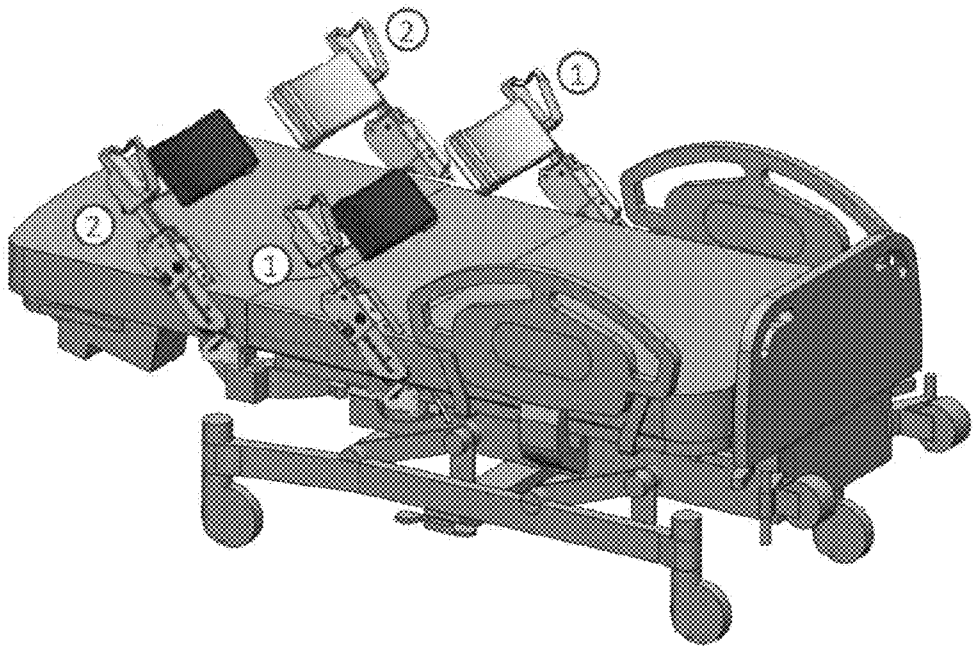
Figure 7: Example of side arms sliding on bed assembly
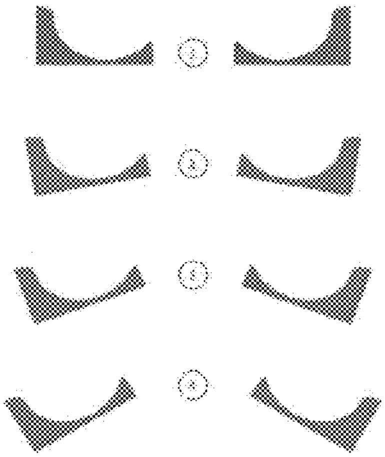
Figure 8: Rotating leg pad positions

MEDICAL PROCEDURE FACILITATION SYSTEM

REFERENCE TO RELATED APPLICATIONS

This application claims the benefit of U.S. provisional application Ser. No. 63/142,686 filed Jan. 28, 2021, the disclosure of which is hereby incorporated in its entirety by reference herein.

TECHNICAL FIELD

One aspect of this disclosure involves a medical procedure facilitation system. In the childbirth procedure, for example, the system provides an adjustable assisting force for patients and staff while raising a patient's legs. In other clinical settings, the system may be usefully deployed in, as non-limiting examples, gynecological examinations and pelvic exams for female and male patients, to reduce the stress experienced during leg raising. The system may operate in two-states 1) a locked state, in which the system is rigid; and 2) an unlocked state where the system's arms can be raised and lowered under the influence of damping forces.

BACKGROUND

In one exemplary environment of use, the most common method of giving birth in a hospital setting involves the patient lying on her back and lifting her knees toward her shoulders. For obese women, especially those with epidurals, this process is especially difficult as they often have trouble bearing the weight of each leg or reaching underneath their thighs to grip behind the knee. The patient is often assisted by a family member or a medical professional who will hold the leg in the correct position. This puts the women at risk of injury, gives the potential for injury to the assistant based on repetitive lifting, and limits the ability of medical professionals to work efficiently. There are no current solutions available to assist obese patients that mimic the natural posture most needed during this process.

An acute need for labor assist systems, as an example of a medical procedure that is facilitated by the disclosed system, is experienced by overweight and obese women.

Suitable labor assist systems are of interest to medical professionals working in prenatal care, gynecology, or obstetrics who are responsible for the well-being of their patients and the success of a delivery.

In this field, there are delivery beds with built-in leg supports that adjust in height. These can be tuned to fit the patient, but are not controlled by the patient and may not lift their legs into the optimal pushing position.

Substitute labor assist products include fabric straps, and BirthBuddy. Though not a labor assist system, YelloFin stirrups attach to any operating room table. They allow the movement of a patient's legs over a range of abduction and flexion with the help of a linear actuator. YelloFin stirrups are not designed to be adjusted by the patient, but by the surgeon. Fabric straps are looped on each leg and the patient's foot goes through one loop. The patient holds the other loop and pulls on the straps to bring her knees back, with more leverage than she would have pulling from under her knees. BirthBuddy provides the rowing pull motion that increases pushing efficacy, but its positioning in front of a bed can restrict the work area of the nurses and doctors.

Products currently on the market do not provide any patient-controlled assisting force, or limits on flexion and abduction to prevent injury. They also lack effective attachment to current hospital beds without interfering with the doctor's access to the patient. Thus, a need has arisen for a labor assist system that surpasses the current products and offers a novel solution.

SUMMARY

Throughout this disclosure non-limiting references are made to gender. It will be appreciated that depending on the medical procedure, the use of male/female and his/her should not be construed as limiting the structure or field of use of the system.

One embodiment of a proposed labor assist system used with a bed involves a shock or damper which can apply compression or rebounding energy to resist or assist the motions of patient-derived forces (collectively hereinafter "gas spring assembly"), supportive thigh pads, hand grips and an optional locking mechanism. The gas spring assembly contributes an assisting force that helps to raise the patient's leg while multiple hand grips allow the patient to provide some of the force themselves. Comfortable pads give support under the knee and thigh and adjust their angle to accommodate the size and position of the patient.

An optional integrated locking mechanism allows the medical staff or patient to lock the framework in place at any position so that the patient can have her legs entirely supported by the system.

Users of such systems include women in labor or men undergoing for example a pelvic or other examination or other operations, and nurses or other assistants who may modify the settings of the system and help the patient.

BRIEF DESCRIPTION OF THE DRAWINGS

FIG. 1 is a perspective view of a labor assist system with two arms secured to a bed;

FIG. 2 is an isometric view of an assist arm;

FIG. 3 is an isometric view of a mounting plate with one assist arm;

FIG. 4 is a side perspective view of an assist arm;

FIG. 5 is a side perspective view of a back side of an assist arm;

FIG. 6 is an example of side arms sliding on a mounting plate;

FIG. 7 is an example of multiple side arm positions that may result from arms that slide along the bed;

FIG. 8 illustrates rotating leg pad positions.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Several embodiments of the labor assist system provide force to alleviate patient strain. The system is coupled to a hospital bed (FIGS. 1, 2). In one example, with the arms (FIG. 2) of the system are mounted in parallel to the sides of the bed. One arm is on the left side and one arm is on the right side. In one case, two arms are secured to a mounting plate 18 (FIG. 3) which then couples to the hospital labor bed. In one embodiment, the arms rotate from the plane of the bed plate from a parallel position to a position up to approximately 80-85 degrees above parallel.

The system includes damped, variable lift assist locking gas cylinders 12 which provide an assisting force for patients in a clinical setting that aid in lifting and holding the legs of the patient in a raised position (FIG. 4). When the system is in the locking state, the gas cylinder release valve is closed, and the arms are rigidly locked. The system arms can be locked at any point along the path of rotation. When the system is in the non-locking state, the arms freely rotate while providing an assisting force to the patient.

The system is switched between the locking state and non-locking state using a two-state switch 11 (FIG. 4). In several embodiments, this feature includes a slider to lock a main arm in place or apply a force to assist a patient lift her thighs. Crossbars are fixed to the arms of the system at 90 degrees pointing into and parallel to the bed (FIG. 1). Leg pads or thigh pad plates 4 are fixed to the crossbars of the system and are positioned on the backside of the patient's thigh directly under the knee. The leg pads are free to rotate to adjust the patient's posture and leg desired position.

The main arms of the system are formed by telescoping tubing 9 that allows the system to be adjusted based on the dimensions and parameters of the patient. The crossbar of the system also has telescoping tubing that can be adjusted to change the angle of the legs. The telescoping of both the arm and crossbar can be maintained in a locked position and can be released by pulling the associated lock plunger 6, 10 (FIGS. 4, 5). In several embodiments, this feature includes a spring-loaded pin that enables the length of the thigh support arm to be adjusted. The system has adjustable hand grips or handles 1, 7, 15, 16 located on the arm and on the inside of the leg pad for the patient to grab while pulling her legs.

The damper or cylinder functioning as a damper is fixed in a linkage system. The front lift assist indicator or clevis 13 is rigidly fixed with one degree of freedom in the plane of the arm rotation (FIG. 4). The rear lift assist adjustment handle or clevis 17 is fixed to a screw with the same one degree of freedom in the plane of arm rotation. By rotating the screw, the rear clevis mounting position of the gas cylinder is translated up and down inside the base of the system. The repositioning of the rear clevis of the gas cylinder changes the angle between the gas cylinder and the arm. Adjusting the angle changes the magnitude of the assisting force.

The system has a non-uniform magnitude of assisting force, providing a larger magnitude of force at the bottom of the arm rotation, where it is more difficult for the patient to lift the legs due to the position and angle of leverage. The telescoping arms and crossbars have metrics for identifying the length and position of each component. A thigh strap 3 can be installed onto the leg pad to constrain the patient (FIG. 5). The crossbar can be decoupled from the arm for on-bed storage and concealment. This configuration uses a thigh pad removal pin 8 that can be removed to release the crossbar (FIG. 4).

The current prototype is an add-on/aftermarket system used in conjunction with the existing hospital labor bed. In an alternate embodiment, the labor assist system could be built into the bed itself.

Mounting options exist. For example, HillRom has guard rails that rotate under the bed. When the user presses a button, it unlocks the system and the system can move off the bed and then slide under the mattress, to be concealed without the need to remove any components.

Optionally, the system may be allowed to slide along the slide of the bed to position better for different patients (FIGS. 6, 7).

If desired, the arm may be allowed to fully rotate down next to the pad for an in-place, but concealed feature.

Another alternative is to reduce the width of the system so it can be installed and rolled through the door with minimal adjustments.

It may be advantageous to allow for universal adapter plate mounting across hospital labor bed designs, like what is installed on the prototype described above.

The current prototype has a fixed flexion hard stop. If desired by the users, an adjustable hard stop would be added to the design to add a safety feature and accommodate different patient needs and different positioning techniques with adjustable flexion limits.

Optionally, the pads may click outwardly like a ratchet and lock in a single position rather than free moving, i.e. providing an abduction limit. Relatedly, one might set the outward angle in a fixed location and/or add a pad rotational detent.

Alternate embodiments may reduce the number of switches and actions, but keep the same amount of features.

If desired, the assisting force adjustment knob could be modified. This could also include increasing the threads per inch on the adjustment screw so one rotation of the handle adjusts the force more slowly and permits finer tuning. Optionally, an electric motor could be added to rotate the screw electrically to the desired force. Further one might improve the switch mechanism and enhance outside functions and the user interface.

Internal mechanics may be made more robust with a linkage. For example, one might modify the handle design or location(s). This might create a stronger locking mechanism with an adjustable handle.

In some cases, the arm pivot may be strengthened with a bushing or steel insert.

Self-skinning foam pads may be used to create a completely sealed pad. The current prototype is wrapped so it has seams and folds. This technique will spray the pad with a liquid which will set up and provide a complete seal and a flexible cover. This will make cleaning easier and reduce the risk of infection or contamination.

Optionally, the guard cover may be modified to remove pinch points. One example is to provide a telescoping/sliding guard.

One prototype is a non-electric option. This provides many advantages and flexibility. However, the system may include mechanical/manual and electrical options. An electrical option is to use a linear actuator or another mechanism.

Another embodiment might electrify the labor assist system with motorized adjustments. This would increase the limits, telescoping tubing, and adjusting the assisting force.

In another embodiment, the crossbar may be allowed to rotate and allow the thighs to be tilted outwardly. Optionally, a spline may be installed to provide variable adjustment points (FIG. 8).

If desired, a leg strap may be adjustable. Such a feature may make it easier to fully remove vs unstringing the whole strap length.

If desired, hard stops for the telescoping tubing could be incorporated so it cannot be completely removed. The telescoping feature could be improved by material changes and possibly adding bearings. Such improvements may reduce friction between sliding components.

Provision of a linear bearing may usefully increase the damping ratio. The current gas cylinders have a 1.5 force extension=force compression. This dampens the force so the system does not fly up quickly. However, the damping ratio should be increased further.

The current prototype has independent sides, meaning the patient can move each leg independently of each other. There are many advantages to this option based on patient and different techniques and positioning (such as the OP position) for child labor. The first option would be independent and the second would be having the sides connected and moving together.

The design may be easier to manufacture if the guards were vacuum formed. Further, this may allow the gas cylinder to be replaced more easily.

If desired, stress and strain gauges may be provided to monitor the forces of the patient.

Optionally, the crossbars may slide freely inwardly and outwardly. This would allow the patient to pull her legs out and set a limit to prevent strain from over abductions. Further, this would allow the pads to return the legs to a more medial position (shoulder width apart). By doing so, the legs are not always in a position characterized by external rotation and abduction of the hip, which could reduce stress and strain due to extended stretching. As the patient lifts her legs, the force would push the legs outwardly, i.e. reducing the length of the crossbar.

It will be appreciated that use of the assisting force technology design for female patients during child and other clinical procedure could benefit male patients during pelvic area procedures and operations.

In some embodiments, the leg pads rotate in a single plane. Optionally, the free rotation of the pad could be outwardly.

In summary, several features of the labor assist system include:

- Adjustable assisting force to accommodate the needs of each patient (depending on weight, effects of epidural, etc.);
- Adjustable length to accommodate different patient parameters (length of leg, the position of the knee may vary even if the patient has short legs the knee may be shifted up because of body size);
- Flexion and abduction limits (currently fixed limits but can/should be adjustable either manually or electrically);
- The system is intended to be operated by the patient with staff intervention for setting limits and adjusting force and/or if the patient is incapable of lifting the legs themselves;
- Adjustable hand grips;
- Damped motions to prevent injury to the patient or staff and damage to the system;
- The system is a two-state system which utilizes variable locking gas cylinders. Using a two-state switch (or lever) the system is able to perform as a locked system or a non-locking system depending on the application and needs;
- The system is manually operated; and
- The two sides of the system are independent of each other.

TABLE OF REFERENCE NUMBERS

| Reference No. | Component |
|---|---|
| 1 | Handle Grip |
| 2 | Thigh Pad |
| 3 | Thigh Strap Attachment Point |
| 4 | Thigh Pad Plate |
| 5 | Adjustable Thigh Support Arm |
| 6 | Spring Loaded Pin to Adjust Length of Thigh Support Arm |
| 7 | Hand Grip Strap Length Adjustment Piece |
| 8 | Thigh Pad Removal Pin |
| 9 | Main Arm |
| 10 | Spring Loaded Pin to Adjust Length of the Main Arm |
| 11 | Slider to Lock Main Arm in Place or Apply Force to Assist Patient Lift her Thighs |
| 12 | Gas Charged Lift Assist Cylinder |
| 13 | Front Lift Assist Indicator or Clevis |
| 14 | Mounting Hole |
| 15 | Hand Grip |
| 16 | Hand Grip |
| 17 | Lift Assist Adjustment Handle or Clevis |
| 18 | Bed Plate |
| 19 | Clearance Hole |
| 20 | Mounting Holes for Main Arm Assembly |

While exemplary embodiments are described above, it is not intended that these embodiments describe all possible forms of the disclosed medical procedure facilitation system. Rather, the words used in the specification are words of description rather than limitation, and it is understood that various changes may be made without departing from the spirit and scope of the invention. Additionally, the features of various implementing embodiments may be combined to form further embodiments of the invention.

We claim:

1. A medical procedure facilitation system configured for use with a recumbent or semi-recumbent patient on a bed or surgical table, the bed or surgical table having lateral edges, the system comprising:

a pair of assist arms secured to the lateral edges and that are adapted to move in a plane that lies parallel to the lateral edges along a path of rotation;

a pair of bi-state spring assemblies, each bi-state spring assembly connected to an assist arm of the pair of assist arms and providing an adjustable, rotational force to the assist arm that assists in raising and securing one or more positions of the patient's legs, wherein each assist arm has a proximal end and a distal end, wherein each bi-state spring assembly has a proximal end and a distal end, wherein the proximal end of each bi-state spring assembly is located a distance from the proximal end of the assist arm to which it is connected, wherein the rotational force from the pair of bi-state spring assemblies rotates the assist arm about the proximal end of the assist arm;

supportive pad sub-assemblies associated with the assist arms that offer support under the thighs of the patient; and hand grips mounted on the assist arms and/or the pad sub-assemblies that allow the patient to contribute to lifting forces.

2. The medical procedure facilitation system of claim 1, further including an integrated locking mechanism for securing one or both assist arms in place.

3. The medical procedure facilitation system of claim 1, wherein the supportive pad sub-assemblies include an adjusting mechanism so that an angle of inclination may be adjusted to accommodate the size and position of the patient.

4. The medical procedure facilitation system of claim 1, wherein each bi-state spring assembly includes a locked state, in which the system is rigid and an unlocked state, in which the assist arms can be raised and/or lowered under the influence of at least some damping forces provided by the bi-state spring assemblies.

5. The medical procedure facilitation system of claim 1, further including the bed or surgical table to which the system is secured.

6. The medical procedure facilitation system of claim 1, wherein the bi-state spring assemblies provides a shock feature or a damping feature which are adapted to apply compression or rebounding energy to resist or assist patient-derived forces.

7. The medical procedure facilitation system of claim 1, wherein the hand grips are mounted on the pair of assist arms and/or the pad sub-assemblies.

8. The medical procedure facilitation system of claim 7, wherein the bi-state spring assemblies contribute a force that helps lift or position one or more legs of the patient, the hand grips allowing the patient to contribute to assisting force.

9. The medical procedure facilitation system of claim 8, wherein the rotational force that provides an assisting influence is greater at a lower region of arm rotation, where it is more difficult for the patient to lift her or his legs.

10. The medical procedure facilitation system of claim 2, wherein the integrated locking mechanism includes a locking feature that allows the medical staff or the patient to lock the system in place at any position so that the patient can have her or his legs supported completely or almost completely by the system.

11. The medical procedure facilitation system of claim 1, wherein each assist arm in the pair of assist arms are adapted to move independently of the other assist arm in the pair.

12. The medical procedure facilitation system of claim 1, further including a mounting plate to which the pair of assist arms is attached that cooperates with the bed or surgical table to secure the system.

13. The medical procedure facilitation system of claim 1, wherein one or both of the assist arms of the pair of assist arms are adapted to rotate from a first position including a plane of the bed through intermediate positions to a second position that lies 80-85 degrees above the first position.

14. The medical procedure facilitation system of claim 1, wherein the pair of assist arms are positionable along the lateral edges of the bed to accommodate patients of various sizes.

15. The medical procedure facilitation system of claim 1, further including an assisting force adjustment feature that cooperates with one or more assist arms in the pair of assist arms.

16. The medical procedure facilitation system of claim 1, wherein at least one of the bi-state spring assemblies includes a gas spring assembly.

17. The medical procedure facilitation system of claim 1, wherein the supportive pad sub-assemblies include telescoping tubing extending from one of the pair of assist arms, the telescoping tubing engaging a crossbar that adjustably secures a pad.

18. A method of assisting a patient who is recumbent or semi-recumbent on a bed or surgical table having lateral edges, the patient being subjected to a medical procedure that involves flexion, external rotation, and/or abduction of the lower extremity, the method comprising the steps of, not necessarily in the order presented:

securing a pair of assist arms to the lateral edges of the bed or surgical table, the pair of assist arms being adapted to move in a plane that lies parallel to the lateral edges along a path of rotation;

connecting a pair of bi-state spring assemblies to the assist arms for providing a rotational force to each assist arm that assists in raising and securing one or more positions of the patient's legs, wherein each assist arm has a proximal end and a distal end, wherein each bi-state spring assembly has a proximal end and a distal end, wherein the proximal end of each bi-state spring assembly is located a distance from the proximal end of the assist arm to which it is connected, wherein the rotational force from the pair of bi-state spring assemblies rotates the assist arm about the proximal end of the assist arm;

linking pad sub-assemblies to the assist arms, the pad sub-assemblies offering support under the thighs of the patient; and mounting hand grips on the assist arms and/or the pad sub-assemblies that allow the patient to contribute to lifting forces.

19. The method of claim 18, further including an integrated locking mechanism for securing one or both assist arms in place.

20. The method of claim 18, wherein the supportive pad sub-assemblies include an adjusting mechanism so that an angle of inclination may be adjusted to accommodate the size and position of the patient.

* * * * *